United States Patent [19]

Nakamura et al.

[11] Patent Number: 5,272,930

[45] Date of Patent: Dec. 28, 1993

[54] MECHANICAL ELEMENT HAVING A SHAFT PRESSURE-FITTED INTO AN ENGAGING MEMBER AND ITS MANUFACTURING METHOD

[75] Inventors: Yoshikatsu Nakamura; Yasukichi Egami; Shunsuke Takeguchi; Ken Akimoto, all of Nogi, Japan

[73] Assignee: Nippon Piston Ring Co., Ltd., Tokyo, Japan

[21] Appl. No.: 894,568

[22] Filed: Jun. 5, 1992

[30] Foreign Application Priority Data

Jun. 7, 1991 [JP] Japan .................. 3-136031
Oct. 19, 1991 [JP] Japan .................. 3-271568

[51] Int. Cl.⁵ .............................................. F01L 1/04
[52] U.S. Cl. .................... 74/434; 29/888.1; 29/893.2; 74/567; 403/282
[58] Field of Search ............... 74/567, 434; 29/888.1, 29/893.1, 893.2, 525; 403/282

[56] References Cited

U.S. PATENT DOCUMENTS

| | | | |
|---|---|---|---|
| 2,704,465 | 3/1955 | Haller | 74/567 X |
| 4,376,333 | 3/1983 | Kanamaru et al. | 403/285 X |
| 4,597,365 | 7/1986 | Madaffer | 74/567 X |
| 4,632,074 | 12/1986 | Takahashi et al. | 123/90.39 |
| 4,783,898 | 11/1988 | Kanamaru et al. | 74/567 X |
| 4,847,963 | 7/1989 | Bendoraitas et al. | 29/888.1 |
| 4,886,392 | 12/1989 | Iio | 403/282 |
| 4,903,543 | 2/1990 | Matt | 74/567 |
| 4,947,547 | 8/1990 | Matt | 74/567 X |
| 4,969,262 | 11/1990 | Hiraoka et al. | 74/567 X |

FOREIGN PATENT DOCUMENTS

| | | | |
|---|---|---|---|
| 0233562 | 10/1987 | Japan | 74/567 |
| 0223557 | 10/1991 | Japan | 74/567 |

Primary Examiner—Rodney H. Bonck

[57] ABSTRACT

A mechanical element has a shaft pressure-fitted into at least one composite engaging member. The shaft has at least one engaging region disposed thereon, and at least one swollen portion formed radially outwardly around the engaging portion. The composite engaging member comprises an engaging body made of sintered alloy and having a recess therein, and a ring-shaped steel inner piece having a hardness not greater than the swollen portion. The inner piece is secured to the inside circumference of the recess of the engaging body by a securing method. The inner piece has a shaft hole formed therein, the shaft hole having a plurality of a larger inside diameter portions and a plurality of a smaller inside diameter portions arranged circumferentially, with the smaller inside diameter arranged to be smaller than the outside diameter of the swollen portion of the shaft. The composite engaging member is then pressure-fitted onto the shaft mainly in a plastic-deforming operation, with a minor chip-removing operation, if any, between the swollen portion and the shaft hole, to form the mechanical element.

16 Claims, 5 Drawing Sheets

RELATION AMONG KNURLING, BONDING STRENGTH AND PRESSURE-FITTING LOAD

ANNULAR-GROOVE KNURLING
△

DIAMOND KNURLING
○

AXIAL-GROOVE KNURLING
□

FIG. 6

RELATION BETWEEN POLYGONAL BORE AND BONDING STRENGTH

FIG. 7

EFFECT OF INNER PIECE ON BONDING STRENGTH

WITHOUT INNER PIECE      WITH INNER PIECE

MECHANICAL ELEMENT HAVING A SHAFT PRESSURE-FITTED INTO AN ENGAGING MEMBER AND ITS MANUFACTURING METHOD

BACKGROUND OF THE INVENTION

1. Field of the Invention

The present invention relates to improvements in a mechanical element having a shaft pressure-fitted into at least one engaging member made of sintered alloy and manufactured separately from the shaft, and more particularly, to a camshaft for internal combustion engines with relatively high torque loads, a mechanical element with its shaft hole located eccentric to the center of its engaging member(s), such as a crankshaft for compressors, and a mechanical element with its shaft hole located concentric with its engaging member(s).

The present invention also relates to a method of manufacturing the mechanical element described above.

2. Description of the Prior Art

A method for assembling a mechanical element where an engaging member(s), such as a cam made of sintered alloy, is diffusion-bonded onto a steel shaft was difficult to reduce manufacturing cost due to the requirement for a relatively large-scale furnace. Then, a method for manufacturing a camshaft by assembling an engaging member(s) and a shaft together with cutting fit which does not require a furnace, was proposed, as disclosed in U.S. Pat. Nos. 4,903,543 and 4,947,547. In this method, the camshaft is manufactured through the steps of forming a swollen portion(s) radially outwardly around a shaft with compression working method such as rolling, and bringing a cam(s) and the shaft together by pressure-fitting the cam onto the shaft so that inwardly projecting portions, that are disposed on the inside surface of a shaft hole of the cam, cut the swollen portion of the shaft to form grooves thereon.

The prior art manufacturing method, disclosed above, has several disadvantages as follows:

(1) To enable the swollen part of the shaft to be cut by the engaging member such as a cam, the shaft is required to be of mild hardness material relative to the cam, which in turn has to be of hard material, taking the necessity for wear and abrasion resistance of the cam into consideration. When a hollow shaft is employed, however, the hollow shaft tends to have to be made having a relatively greater thickness since cutting a hollow shaft of mild hardness causes decrease of the strength thereof, thereby the extent of lightening the shaft is limited.

(2) In the case where the engaging member, such as a cam, is liquid phase sintered material, known to be wear and abrasion resistant, the cam shrinks by 5 to 7% due to sintering before assembly with the shaft, thereby requiring the shaft hole to be worked after the sintering, for the purpose of maintaining accuracy of the inside diameter of the cam, which turned out to require considerable man-hours.

(3) The chip caused by the engaging member, such as the cam, cutting the swollen portion of the shaft, also required considerable man-hours to handle.

(4) In the case where the engaging member only comprises sintered alloy material, if the engaging member is not a high strength material, it often gets cracked when being assembled by cutting-fit, and, even if not cracked during the assembling, it often gets cracked when being loaded with a high torque while in use. In the case of an engaging member of high strength sintered alloy being employed to prevent such cracks, however, material and working costs tend to be extremely high. The present invention is made to solve such problems.

SUMMARY OF THE INVENTION

It is therefore an object of the present invention to provide a mechanical element manufactured by forming at least one swollen portion radially outwardly around a shaft and bringing at least one engaging member and the shaft together with pressure-fit between the engaging member and the swollen portion of the shaft, so that:

(1) the shaft can be made of a thin tube for lighter weight;

(2) finishing work of the shaft hole of the engaging member for maintaining accuracy of the inside diameter of the shaft hole after sintering, is not necessary even when the engaging member is of liquid phase sintered material;

(3) chip is either not caused, or is, little if caused, by pressure-fit between the engaging member and the shaft; and (4) the engaging member would not tend to be cracked either when being pressure-fitted onto the shaft or when being loaded with a high torque while in use.

In order to solve the problems described above, according to one embodiment of the present invention, there is provided a mechanical element having a shaft pressure-fitted into at least one composite engaging member, where the shaft has at least one engaging region disposed thereon, and at least one swollen portion formed radially outwardly around the engaging portion. The composite engaging member comprises an engaging body made of sintered alloy and having a recess therein, and a ring-shaped steel inner piece having a hardness not greater than the swollen portion, the inner piece being secured to the inside circumference of the recess of the engaging body of a securing method. The inner piece has a shaft hole formed therein, the shaft hole having a plurality of large inside diameter portions and plurality of a smaller inside diameter portions arranged circumferentially, with the smaller inside diameter arranged to be smaller than the outside diameter of the swollen portion of the shaft. According to the present invention, the composite engaging member is then pressure-fitted onto the shaft mainly in a plastic-deforming operation, with a minor chip-removing operation, if any, between the swollen portion and the shaft hole, to form the mechanical element.

As described above, the mechanical element, according to the present invention, is manufactured based on a pressure-fit method, where an inner piece having a hardness not greater than the shaft material, is closely fitted onto the swollen portion of the shaft mainly in a plastic-deforming operation, with a minor chip-removing operation, if any, contrary to the cutting or chip-removing fit operation of the prior art method, where the inwardly protruding portions disposed on the inside circumference of the engaging members of sintered alloy of relatively high hardness, cut the swollen portion of the shaft of relatively low hardness only in a chip-removing operation, to accomplish the fit.

Therefore, the mechanical element according to the present invention has an advantage in that a thin wall tubular-shaped shaft can be employed, since the shaft wall is not cut by the inner piece, whereby a lighter mechanical element can be obtained.

Also, according to an aspect of the present invention, the inner piece is secured to the inside circumference of the recess of the engaging body by a sintering-based diffusion bonding, which is highly reliable due to the great carbon density difference between the engaging body and the inner piece. The shaft hole of the inner piece does not tend to deform by sintering even when liquid phase sintered material of high shrinkage rate is employed for the engaging body.

Thus, finishing work for the shaft hole of the inner piece after sintering is not required to maintain the accuracy of the shaft hole dimensions even when liquid phase sintered material of high shrinkage rate is employed for the engaging body. Accordingly, the high man-hours or cost of such finishing work is eliminated.

Furthermore, when the composite engaging member is pressure-fitted onto the shaft, the smaller inner diameter portions of the inner piece of relatively lower hardness, is closely fitted onto the swollen portion of the shaft of relatively higher hardness mainly in a plastic-deforming operation, with a minor chip-removing operation, if any, thus resulting in significantly smaller chip volume than in the prior art method. This enables an easier chip handling, which in turn facilitates automation of the assembling process.

Also, according to the present invention, since the composite engaging member comprises the engaging body of sintered metal, and the inner piece of relatively lower hardness, and the inner piece handles forces and stresses to and from the shaft instead of engaging member of sintered metal in the prior art method, crack occurrence in the engaging body during assembly or when being loaded with a high torque while in use, can be prevented.

Finally, in an aspect of the present invention, in the case where the inner piece has the same hardness as in the shaft, the plastic-deformation mutually occurs on both the inner piece and the swollen portion, resulting in a mutual bondage which is significantly greater than the bondage in the prior art method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, wherein.

DESCRIPTION OF THE PREFERRED EMBODIMENTS

The present invention will be described, in detail, according to embodiments referring to the accompanying drawings.

Figure 1A:
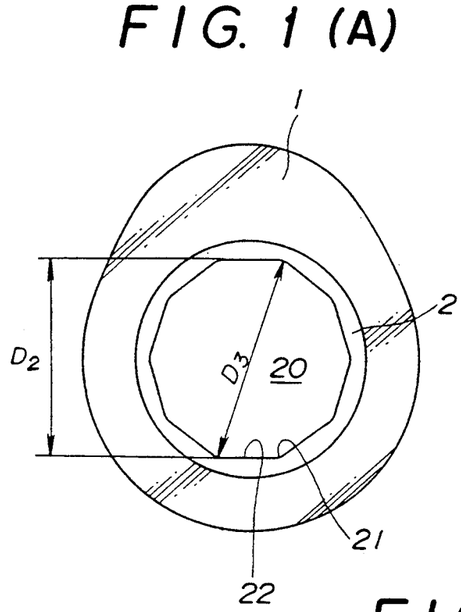
FIGS. 1(A) and 1(B) are an elevational view, and a side elevational view in section, respectively, of a cam according to a first embodiment of the present invention.
Figure 1B:
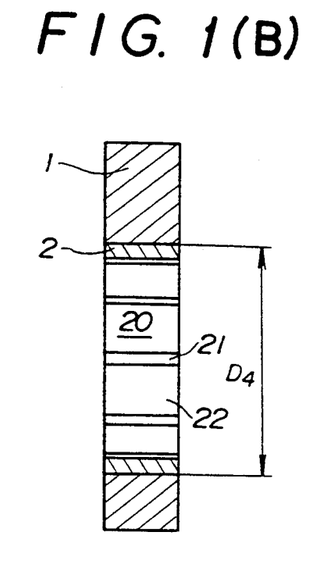
Figure 2:
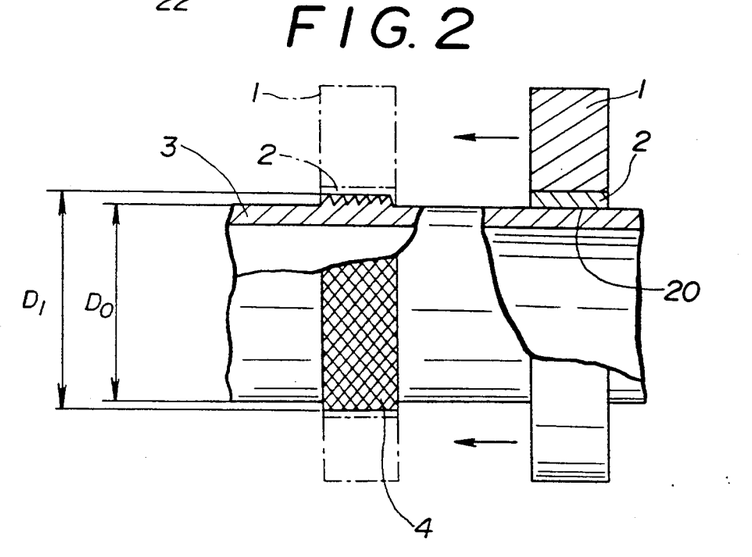
FIG. 2 is a partial side elevational view of a camshaft showing a procedure of fitting the cam of FIG. 1(A) and 1(B) onto a shaft.

As shown in FIGS. 1(A), 1(B), and 2, an engaging body, a cam in this case, 1, according to a first embodiment of the present invention, defines a cam profile, and has a recess, or hole. A ring-shaped inner piece 2 has a shaft hole 20 of a decagonal shape with rounded corners. Vertex or corner portions of the shaft hole 20 each constitute a larger inside diameter portion 21 having an inside diameter D3, which is larger than the outside diameter D1 of a swollen portion 4 of a shaft 3. Chord or side portions between the vertex portions of the shaft hole 20 each constitute a smaller inside diameter portion 22 having an inside diameter D2. The cam 1 is of liquid phase sintered material. The inner piece 2 is disposed in the recess of the cam 1, and the internal circumference of the recess of the cam 1 is shrunk by liquid phase sintering and diffusion-bonded on the external circumference of the inner piece 2 of low carbon steel. Since the inner piece of low carbon steel is non-sintered material, both the shape of the shaft hole 20 and the accuracy of the inside diameters of the inner piece 2 remain unchanged before and after sintering.

At least one swollen portion 4 having an outside diameter D1, which is larger than the outside diameter D0 of shaft 3, is formed around the external circumference of at least one engaging region of the shaft 3 by applying tube swelling process with knurling tool. The outside diameter D1 of the swollen portion 4 is set at a value smaller than the outside diameter of the inner piece 2, preferably smaller than the inside diameter D3 of the larger inside diameter portion 21 of the shaft hole 20, and larger than the inside diameter D2 of the smaller inside diameter portion 22. Thereby, when the shaft hole 20 of the inner piece 2 is pressure-fitted onto the swollen portion 4 of the shaft 3, in the direction of an arrow shown in FIG. 2, the smaller inside diameter portion 22 is mainly plastic-deformed by the swollen portion 4, but without being cut by the swollen portion 4, and closely fitted on the swollen portion 4. At that time, the swollen portion 4 is not cut either, thus, the pressure-fitting procedure, according to the present invention, does not cause any decrease in strength of the shaft 3. It is noted that even if minor cutting or chip-removing may be caused in the smaller inside diameter portion 22 by the swollen portion 4 during the pressure-fitting procedure, chip volume so generated is significantly smaller than in case of the prior art method.

The camshaft assembled as described above, does not require large-scale furnace facilities for fitting a cam of sintered alloy onto a shaft by sintering. Subsequently, decrease in strength of the shaft caused by heat treatment is avoided. Also, the cam 1 is not likely to get cracked during the shaft fitting procedure or when being loaded with high torque while in use, since the stress occurring during the shaft fitting procedure or caused by high torque while in use affects, not the cam 1 of sintered material, but the inner piece 2. Also, in the case where the inner piece 2 is arranged to have the same hardness as in the shaft 3, the fitting is effected in a mutual plastic-deforming procedure, where both the inner piece 2 and the shaft 3 are subjected to plastic deformation, resulting in a higher bonding strength due to mutual joining.

Figure 3A:
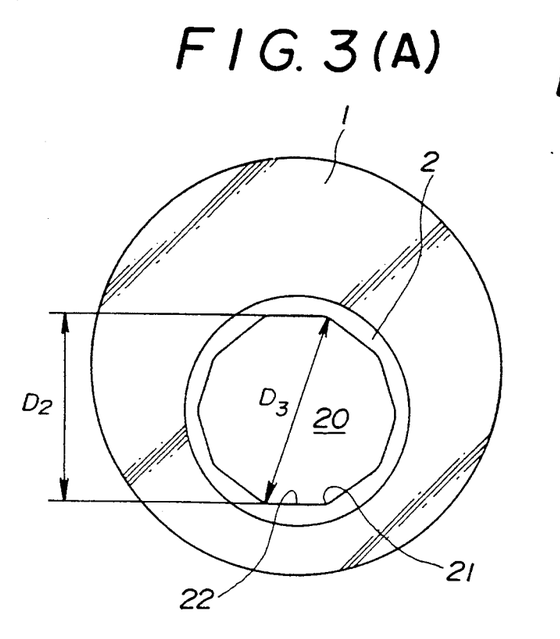
FIGS. 3(A) and 3(B) are views corresponding to FIGS. 1(A) and 1(B), respectively, of a second embodiment of the present invention.
Figure 3B:
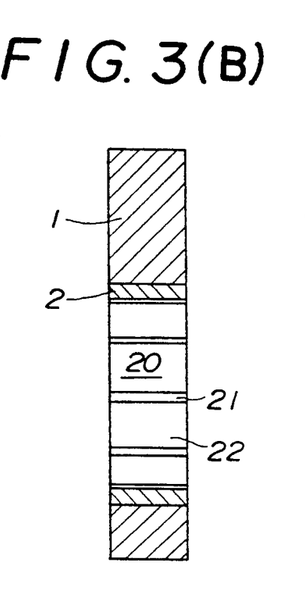

FIGS. 3(A) and 3(B) show; another example of an engaging body, a crank in this case, 1, according to a second embodiment of the present invention, which is an engaging body for a crankshaft for compressors. The crank 1 is a thick hollow circular plate of sintered alloy, with a recess located eccentric to the center of the crank. A ring-shaped inner piece 2 of low carbon steel is inserted in the recess of the crank 1 and diffusion-bonded to the crank 1. The shaft hole 20 of the inner piece 2 in FIGS. 3(A) and 3(B) is arranged to be of the same decagon as in the first embodiment shown in FIGS. 1(A) and 1(B). Other dimensional relations of the swollen portion 4 of the shaft 3 with the inside diameter D3 of the larger inside diameter portion 21, and the inside diameter D2 of the smaller inside diameter portion 22, is also arranged the same as in the first embodiment shown in FIGS. 1(A) and 1(B).

Figure 4A:
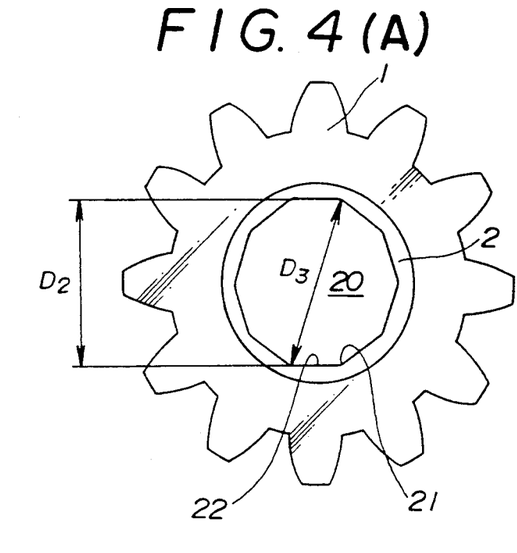
FIGS. 4(A), (B) are views corresponding to FIGS. 1(A), 1(B), respectively, of a third embodiment of the present invention.
Figure 4B:
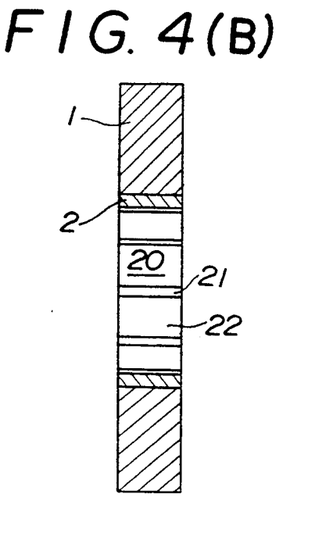

Shown in FIGS. 4(A) and 4(B) is a further example of engaging body, a gear in this case, 1, according to a third embodiment of the present invention, which is an engaging body for a gear shaft. The gear 1 is of sintered alloy, with a recess located concentric with the center of the gear. A ring-shaped inner piece 2 of low carbon steel is inserted in the recess of the gear 1 and diffusion-bonded to the gear 1. The shaft hole 20 of the inner piece 2 in FIGS. 4(A) and 4(B) is arranged to be of the same decagon as in the first embodiment shown in FIGS. 1(A) and 1(B). Other dimensional relations of the swollen portion 4 of the shaft 3 with the inside diameter D3 of the larger inside diameter portion 21, and the inside diameter D2 of the smaller inside diameter portion 22, is also arranged the same as in the first embodiment shown in FIGS. 1(A) and 1(B).

The composite engaging member comprising the engaging body 1 and the inner piece 2, shown in FIGS. 3(A), 3(B), 4(A) and 4(B), is pressure-fitted onto the swollen portion 4 of the shaft 3, mainly by a plastic-deformed procedure, to assemble a crankshaft and a gear shaft, respectively, as a mechanical element. The fitting procedure for the second and third embodiments are substantially the same as illustrated for the first embodiment and shown in FIG. 2.

Figure 5:
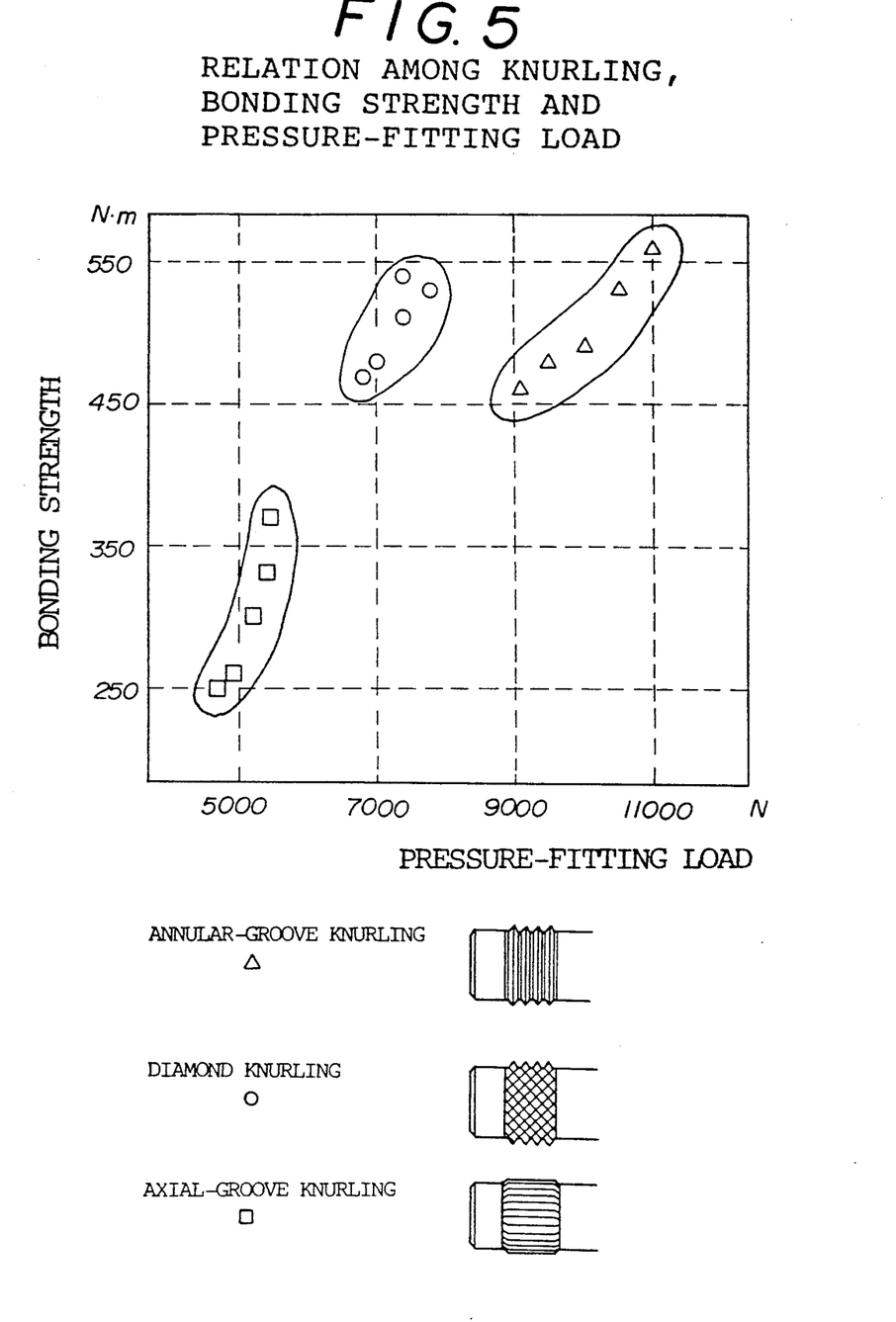
FIG. 5 is a graph showing the relations among the configuration of the swollen portion, or knurling, around the shaft, bonding strength, and pressure-fitting load.

FIG. 5 is a graph showing a result of test measurement for pressure-fitting load and bonding strength when a composite engaging member, comprising an engaging body 1, and an inner piece 2 having a regular hexagonal-shaped shaft hole, is fitted onto the swollen portions 4 of three kinds of configurations formed around the external circumference of the shaft 3 by applying tube swelling process with knurling tool. The shaft is of steel material corresponding to SAE1050. The three kinds of configuration of the swollen portion include an axial-groove knurling continuously extending axially, a diamond knurling intermittently extending spirally, and an annular-groove knurling continuously extending annularly. The engaging body 1 is a cam of Fe-8% Cr alloy. The shaft hole is of a hexagonal shape, and the axial length of the swollen portion is 11 mm. The maximum interference between the composite engaging member and the shaft is 0.8 mm. This graph shows that in the case of the swollen portion of an axial-groove knurling continuously extending axially, plotted by square marks as shown in FIG. 5, relatively small pressure-fitting load is only required while amply high bonding strength, i.e., amply high load torque, cannot be obtained. The graph also shows that, though amply high and substantially same level bonding strength, i.e., load torque, can be obtained for the swollen portions of a diamond knurling intermittently extending spirally, plotted by circular marks as shown in FIG. 5, and an annular-groove knurling continuously extending annularly, plotted by triangular marks as shown in FIG. 5, the pressure-fitting load for the diamond knurling is lower lower than the annular-groove knurling.

Figure 6:
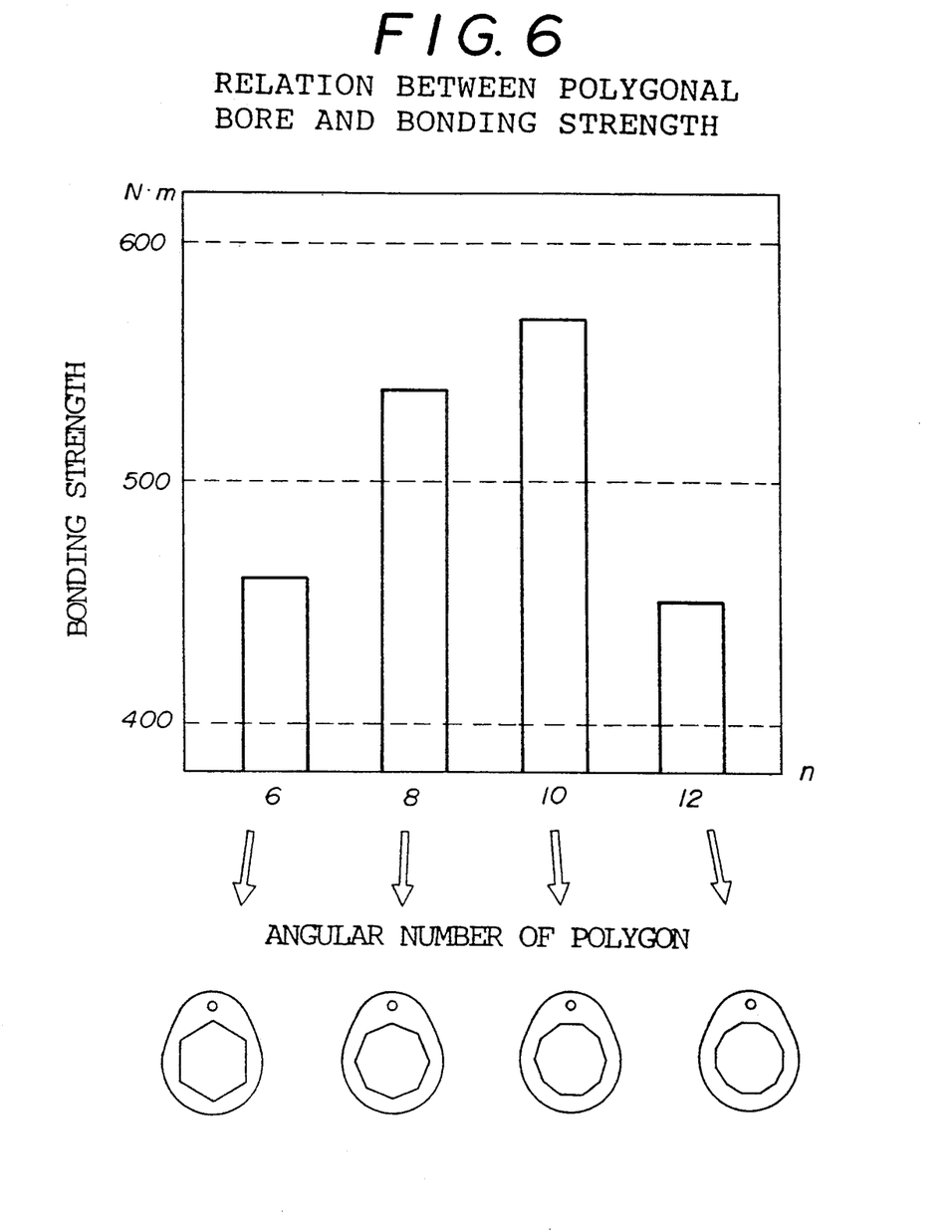
FIG. 6 is a graph showing the relations between angular number of polygon of the shaft hole, or bore, and bonding strength.

FIG. 6 is a graph showing a result of test measurement for bonding strength when composite engaging members, comprising an engaging body 1, and an inner piece 2, where each inner piece 2 has each of a series of regular polygonal-shaped shaft holes, are respectively fitted onto the swollen portions 4, of the shaft 3, with a diamond knurling, where each of the series of regular polygonal shapes of the shaft hole, has the same value for the inside diameter of the larger inside diameter portion thereof, or has a circumscribed circle of the same diameter. The shaft is of steel material corresponding to SAE1050. The engaging body 1 is a cam of Fe-8% Cr alloy. The axial length of the swollen portion is 11 mm, and the shaft holes are respectively of a regular hexagonal, octagonal, decagonal, and dodecagonal shape. This graph shows that the bonding strength, i.e., load torque for the shaft holes of octagonal or decagonal shape is greater than that of hexagonal and dodecagonal shape.

Figure 7:
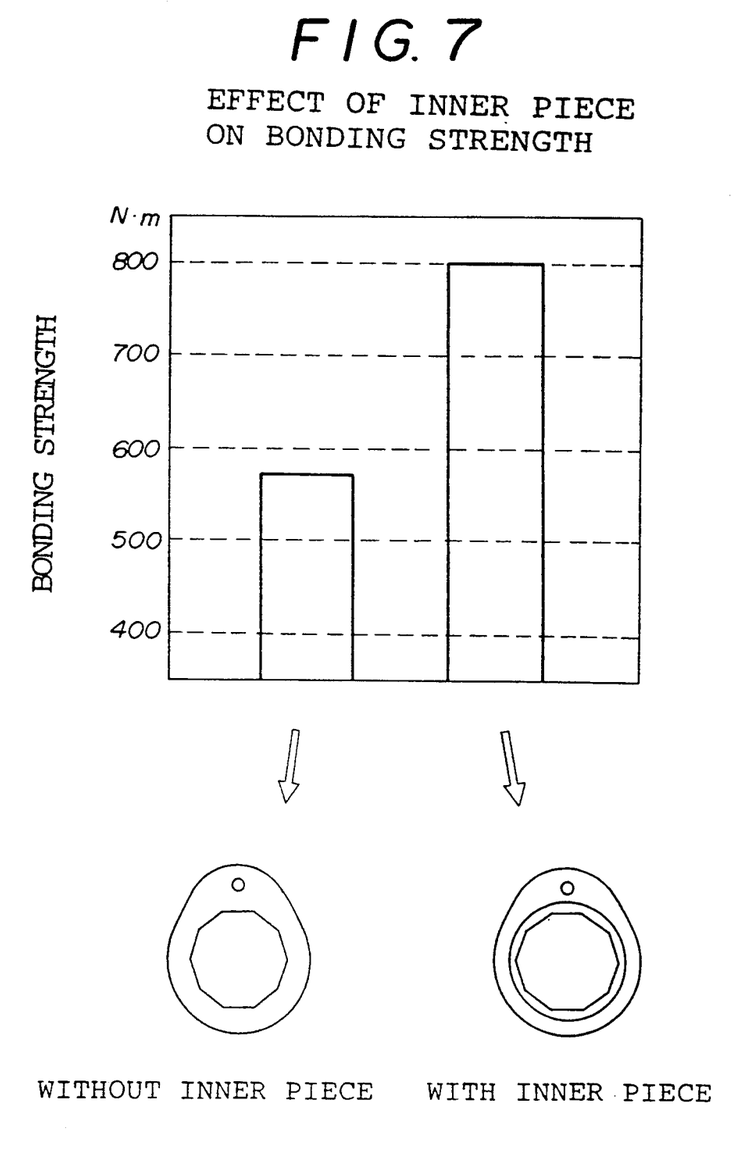
FIG. 7 is a graph showing the relations between existence or non-existence of the inner piece, and bonding strength.

FIG. 7 is a graph showing a result of test measurement for bonding strength when a composite engaging member having an inner piece with a shaft hole of decagonal shape, and an engaging member with a shaft hole of decagonal shape, but without an inner piece, are respectively fitted onto the swollen portions 4, of the shaft 3, having a diamond knurling. The material, configuration and dimensions for the shaft and the engaging member is the same as illustrated in FIG. 6, except the inner piece. This graph for "effect of inner piece on bonding strength", shows that the bonding strength for the joint with the inner piece, is greater than that for the joint without the inner piece.

The description of the embodiments according to the present invention has been made as employing, for example, the diffusion bonding for the securing method for the engaging body 1 and the inner piece 2, the tubular swelling method with knurling tool for forming the swollen portion 4 of the shaft 3, and the regular decagonal shape for the shaft hole 20 of the inner piece 2.

However, the present invention is not limited by such embodiments. Accordingly, the securing or joining methods for the engaging body 1 and the inner piece 2 may include brazing and welding, in addition to the diffusion bonding. As a method for forming the swollen portion 4 of the shaft 3, machining can be used instead of tubular swelling. Furthermore, the shape of the shaft hole 20 does not have to be limited to the decagonal shape, but other polygonal shapes, or even inner teeth shapes can be employed, within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mechanical element having a shaft pressure-fitted into at least one composite engaging member comprising:

said shaft having at least one engaging region disposed thereon, the shaft having at least one swollen portion formed radially outwardly around said engaging portion;

said composite engaging member including an engaging body made of sintered alloy, said engaging body having a recess disposed therein and having a minimum radial width;

said engaging body having a ring-shaped steel inner piece secured to the inside circumference of said recess of said engaging body by a securing method, the inner piece having a maximum radial width, said inner piece having a hardness not greater than said swollen portion, the minimum radial width of the engaging body being greater than the maximum radial width of the inner piece such that the inner piece is markedly smaller in radial width than said engaging body, the inner piece being generally circular around an outer circumference thereof, said inner piece having a shaft hole formed axially therein, said shaft hole having a plurality of larger inside diameter portions and a plurality of smaller inside diameter portions, said smaller inside diameters being smaller than an outside diameter of said swollen portion;

said composite engaging member being fitted on said shaft by being pressure-fitted onto said shaft and having at least plastic deformation between said swollen portion and said shaft hole.

2. The mechanical element according to claim 1, wherein the inner piece is secured to the inside of said recess of said engaging body by diffusion bonding and wherein the inner piece is low carbon steel.

3. The mechanical element according to claim 1, wherein the swollen portion of the shaft is formed by tubular swelling with a knurling tool and wherein the outside diameter of the swollen portion is smaller than an outside diameter of the inner piece.

4. The mechanical element according to claim 1, wherein the shaft hole is of a substantially polygonal shape.

5. The mechanical element according to claim 4, wherein an interior of the inner piece has a dodecagonal shape.

6. The mechanical element according to claim 1, wherein an interior of the inner piece has a dodecagonal shape.

7. The mechanical element according to claim 1, wherein the shaft hole is located at a position eccentric to the center of said composite engaging member.

8. The mechanical element according to claim 7, wherein said composite engaging member is a cam profile member and said mechanical element is a camshaft.

9. The mechanical element according to claim 1, wherein said shaft hole is located at a position concentric with the center of said composite engaging member.

10. The mechanical element according to claim 9, wherein the engaging member is a gear.

11. The mechanical element according to claim 1, wherein the composite-engaging member is fitted on said shaft by being pressure-fitted and by using chip-removing, the inner piece being low carbon steel.

12. The mechanical element according to claim 1, wherein the inner piece and the engaging member both have a variable thickness, the thickness of the inner piece at a widest portion thereof being less than the thickness of the engaging member at a thinnest portion thereof.

13. A method for manufacturing a mechanical element having a shaft pressure-fitted into at least one composite engaging member, said shaft having an engaging region disposed thereon, said composite engaging member comprising an engaging body and a ring-shaped inner piece having a generally circular outer circumference, the engaging body being a sintered alloy and having a recess therein, the engaging body having a minimum radial width, the method comprising the steps of:

forming a swollen portion radially outwardly around said engaging portion of said shaft;

forming said composite engaging member by securing said generally circular outer circumference of said inner piece to an inside circumference of said recess of said engaging body by a securing method, said inner piece having a hardness not greater than said swollen portion and having a maximum radial width, the minimum radial width of the engaging body being greater than the maximum radial width of the inner piece such that the inner piece is markedly smaller in radial width than said engaging body;

forming a shaft hole axially in said inner piece, said shaft hole having a plurality of larger inside diameter portions and a plurality of smaller inside diameter portions, said smaller inside diameter portions being smaller than an outside diameter of said swollen portion; and pressure-fitting said shaft into said composite engaging member and causing at least plastic deformation between said swollen portion and said shaft hole.

14. The method according to claim 13, further comprising the step of chip-removing during the step of pressure-fitting.

15. The method according to claim 13, wherein the step of forming said composite engaging member comprises the step of securing the inner piece to the inside of said recess of said engaging body by diffusion bonding.

16. The method according to claim 13, wherein the step of forming the swollen portion of the shaft comprises the step of forming the swollen portion by tubular swelling with a knurling tool.

* * * * *

REEXAMINATION CERTIFICATE (3336th)
United States Patent [19]
akamura et al.

[11] B1 5,272,930
[45] Certificate Issued Sep. 23, 1997

[ ] MECHANICAL ELEMENT HAVING A SHAFT PRESSURE-FITTED INTO AN ENGAGING MEMBER AND ITS MANUFACTURING METHOD

[5] Inventors: Yoshikatsu Nakamura; Yasukichi Egami; Shunsuke Takeguchi; Ken Akimoto, all of Nogi, Japan

[3] Assignee: Nippon Piston Ring Co., Ltd., Tokyo, Japan

Reexamination Request:
No. 90/004,319, Jul. 30, 1996

Reexamination Certificate for:
Patent No.: 5,272,930
Issued: Dec. 28, 1993
Appl. No.: 894,568
Filed: Jun. 5, 1992

[0] Foreign Application Priority Data

Jun. 7, 1991 [JP] Japan ................... 3-136031
Oct. 19, 1991 [JP] Japan ................... 3-271568

[51] Int. Cl.$^6$ ................... F01L 1/04
[52] U.S. Cl. ................... 74/434; 29/888.1; 29/893.2; 74/567; 403/282
[58] Field of Search ................... 74/434, 567; 403/282; 29/888.1, 893.1, 893.2, 525

[56] References Cited

U.S. PATENT DOCUMENTS

| | | |
|---|---|---|
| 2,704,465 | 3/1955 | Haller . |
| 4,376,333 | 3/1983 | Kanamaru et al. . |
| 4,597,365 | 7/1986 | Madaffer . |
| 4,632,074 | 12/1986 | Takahashi et al. . |
| 4,783,898 | 11/1988 | Kanamaru et al. . |
| 4,847,963 | 7/1989 | Bendoraitas et al. ........... 29/888.1 |
| 4,886,392 | 12/1989 | Iio ........... 403/282 |
| 4,903,543 | 2/1990 | Matt ........... 74/567 |
| 4,947,547 | 8/1990 | Matt . |
| 4,969,262 | 11/1990 | Hiraoka et al. ........... 29/888.1 |

FOREIGN PATENT DOCUMENTS

| | | | |
|---|---|---|---|
| 62-233562 | 10/1987 | Japan | ........... 74/567 |
| 2150542 | 6/1990 | Japan . | |
| 3-223557 | 10/1991 | Japan | ........... 74/567 |

*Primary Examiner*—Rodney H. Bonck

[57] ABSTRACT

A mechanical element has a shaft pressure-fitted into at least one composite engaging member. The shaft has at least one engaging region disposed thereon, and at least one swollen portion formed radially outwardly around the engaging portion. The composite engaging member comprises an engaging body made of sintered alloy and having a recess therein, and a ring-shaped steel inner piece having a hardness not greater than the swollen portion. The inner piece is secured to the inside circumference of the recess of the engaging body by a securing method. The inner piece has a shaft hole formed therein, the shaft hole having a plurality of a larger inside diameter portions and a plurality of a smaller inside diameter portions arranged circumferentially, with the smaller inside diameter arranged to be smaller than the outside diameter of the swollen portion of the shaft. The composite engaging member is then pressure-fitted onto the shaft mainly in a plastic-deforming operation, with a minor chip-removing operation, if any, between the swollen portion and the shaft hole, to form the mechanical element.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16 is confirmed.

New claims 17–20 are added and determined to be patentable.

*17. The mechanical element according to claim 1, wherein the shaft hole is of a substantially regular polygonal shape.*

*18. The mechanical element according to claim 4, wherein an interior of the inner piece has a decagon shape.*

*19. The mechanical element according to claim 1, wherein an interior of the inner piece has a decagon shape.*

*20. The method according to claim 13, wherein the step of forming forms the shaft hole in a substantially regular polygonal shape.*

* * * * *